US012715375B2

(12) United States Patent
Mori

(10) Patent No.: US 12,715,375 B2
(45) Date of Patent: Aug. 25, 2026

(54) VEHICLE CONTROLLER

(71) Applicant: TOYOTA JIDOSHA KABUSHIKI KAISHA, Toyota (JP)

(72) Inventor: Kazuya Mori, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 111 days.

(21) Appl. No.: 18/224,394

(22) Filed: Jul. 20, 2023

(65) Prior Publication Data

US 2024/0034252 A1 Feb. 1, 2024

(30) Foreign Application Priority Data

Jul. 28, 2022 (JP) ................................ 2022-120511

(51) Int. Cl.
*B60R 16/023* (2006.01)
*H04W 76/16* (2018.01)
(Continued)

(52) U.S. Cl.
CPC ......... *B60R 16/0231* (2013.01); *H04W 76/16* (2018.02); *H04W 76/18* (2018.02); *B60L 3/0053* (2013.01); *B60L 50/70* (2019.02); *B60L 50/71* (2019.02); *B60L 53/305* (2019.02); *B60L 53/54* (2019.02); *B60L 53/66* (2019.02); *B60L 53/665* (2019.02); *B60L 58/30* (2019.02); *F17C 5/06* (2013.01); *F17C 13/002* (2013.01);
(Continued)

(58) Field of Classification Search
CPC .. B60R 16/0231; H04W 76/16; H04W 76/18; F17C 2221/012; F17C 2223/0123; F17C 2223/036; F17C 2250/032; F17C 2250/034; F17C 2250/043; F17C 2250/0439; F17C 2250/0478; F17C 2250/0491; F17C 2270/0168; F17C 5/06; F17C 13/002; F17C 2250/0694; F17C 2270/0184; Y02T 90/16; B60L 53/305; B60L 53/54; B60L 53/66; B60L 58/30; B60L 50/70; B60L 50/71; H04Q 9/00; G08C 17/02; G08C 23/04
USPC ........................................................ 701/36
See application file for complete search history.

(56) References Cited

U.S. PATENT DOCUMENTS 10,648,618 B2 * 5/2020 Uchida .................. F17C 13/02
10,782,173 B2 * 9/2020 Mathison ............. F17C 13/023
(Continued)

FOREIGN PATENT DOCUMENTS

DE 10 2015 206 781 A1 10/2016
JP 2010-236673 A 10/2010
(Continued)

*Primary Examiner* — Jelani A Smith
*Assistant Examiner* — Dana D Ivey
(74) *Attorney, Agent, or Firm* — Oliff PLC

(57) ABSTRACT

The vehicle controller is programmed to make a communication attempt from the first communication device to an energy supply device when the energy supply device supplies energy to the energy storage device from an external energy supply device; supply energy with communication between the first communication device and the energy supply device when a response is received from the energy supply device to the communication attempt; and supply energy with communication between the second communication device and the energy supply device when no response is received from the energy supply device to the communication attempt.

4 Claims, 2 Drawing Sheets

(51) Int. Cl.

| | |
|---|---|
| ***H04W 76/18*** | (2018.01) |
| *B60L 3/00* | (2019.01) |
| *B60L 50/70* | (2019.01) |
| *B60L 50/71* | (2019.01) |
| *B60L 53/30* | (2019.01) |
| *B60L 53/54* | (2019.01) |
| *B60L 53/66* | (2019.01) |
| *B60L 58/30* | (2019.01) |
| *F17C 5/06* | (2006.01) |
| *F17C 13/00* | (2006.01) |
| *G08C 17/02* | (2006.01) |
| *G08C 23/04* | (2006.01) |
| *H04Q 9/00* | (2006.01) |

(52) U.S. Cl.

CPC .................. *F17C 2221/012* (2013.01); *F17C 2223/0123* (2013.01); *F17C 2223/036* (2013.01); *F17C 2250/032* (2013.01); *F17C 2250/034* (2013.01); *F17C 2250/043* (2013.01); *F17C 2250/0439* (2013.01); *F17C 2250/0478* (2013.01); *F17C 2250/0491* (2013.01); *F17C 2250/0694* (2013.01); *F17C 2270/0168* (2013.01); *F17C 2270/0184* (2013.01); *G08C 17/02* (2013.01); *G08C 23/04* (2013.01); *H04Q 9/00* (2013.01); *Y02T 90/16* (2013.01)

(56) References Cited

U.S. PATENT DOCUMENTS

| | | | | |
|---|---|---|---|---|
| 2007/0213046 | A1* | 9/2007 | Li ......................... | H04L 5/0035 455/419 |
| 2010/0276031 | A1 | 11/2010 | Saiki et al. | |
| 2013/0268130 | A1 | 10/2013 | Adler et al. | |
| 2015/0043662 | A1* | 2/2015 | Igarashi .................. | B60L 53/63 375/257 |
| 2020/0276909 | A1* | 9/2020 | Boisen .................... | B60L 50/71 |
| 2021/0003256 | A1* | 1/2021 | Fukunaga ................ | B67D 7/04 |

FOREIGN PATENT DOCUMENTS

| | | | |
|---|---|---|---|
| JP | 2013-538320 | A | 10/2013 |
| JP | 2015-094364 | A | 5/2015 |
| JP | 2016-001995 | A | 1/2016 |
| WO | 2012/010260 | A1 | 1/2012 |
| WO | 2022/015712 | A1 | 1/2022 |

* cited by examiner

VEHICLE CONTROLLER

CROSS-REFERENCE TO RELATED APPLICATION

The present disclosure claims priority to Japanese Patent Application No.2022-120511 filed on Jul. 28, 2022, which is incorporated herein by reference in its entirety including specification, drawings and claims.

TECHNICAL FIELD

The present disclosure relates to a vehicle controller, more particularly, to a vehicle controller installed in a vehicle equipped with a first communication device and a second communication device.

BACKGROUND

Conventional technologies of this type have been proposed for vehicles equipped with a reserve tank that can be filled with hydrogen or natural gas and a communication connection (see, for example, Patent Documents 1 and 2). In this vehicle, when the reserve tank is filled with hydrogen or natural gas at the filling station, the communication connection is connected to the filling station side, and until the target pressure or target SOC is reached at the filling station side or the vehicle side sends an abort signal, the information from the pressure measuring device at the filling station is used to filling is controlled by the filling station. The communication connections include the bus, the infrared connection, the optical cable, the wireless connection, the Bluetooth connection, and the electrical cable.

CITATION LIST

Patent Literature

PTL1: WO2012/010260
PTL2: JP2013-538320

SUMMARY

However, in the technology described above, when receiving a supply of energy sources such as hydrogen or natural gas from the energy supply device such as the filling station to the energy supply device such as the tank, it is necessary to select the energy supply device equipped with the communication method that can be communicated on the vehicle side. Assuming that the vehicle is equipped with both the first and second communication devices, and that the energy supply device is equipped with both the first and second communication devices or only the second communication device, it is necessary to consider which procedure should be used to establish communication between the vehicle and the energy supply device.

The main purpose of the vehicle controller of the present disclosure that supplied to both energy supply devices equipped with both the first and second communication devices and energy supply devices equipped with only the second communication device, with communication by a more appropriate communication device.

The vehicle controller of the present disclosure has adopted the following means to achieve the main objectives described above.

The vehicle controller for a vehicle including: an energy storage device; a first communication device; and a second communication device that is different from the first communication device, wherein the vehicle controller is programmed to make a communication attempt from the first communication device to an energy supply device when the energy supply device supplies energy to the energy storage device from an external energy supply device; supply energy with communication between the first communication device and the energy supply device when a response is received from the energy supply device to the communication attempt; and supply energy with communication between the second communication device and the energy supply device when no response is received from the energy supply device to the communication attempt.

The vehicle controller of this disclosure is installed in the vehicle equipped with the energy storage device, the first communication device, and the second communication device which is different from the first communication device. The vehicle controller of the present disclosure makes a communication attempt from the first communication device to the energy supply device when supplying energy from the energy supply device outside to the energy storage device. The vehicle controller supplies energy with communication between the first communication device and the energy supply device when a response is received from the energy supply device to the communication attempt. The vehicle controller supplies energy with communication between the second communication device and the energy supply device when no response is received from the energy supply device to the communication attempt. That is, the vehicle controller prioritizes energy supply with communication by the first communication device over energy supply with communication by the second communication device. The vehicle controller of the present disclosure can provide energy supply with communication by a more appropriate communication device, assuming that communication by the first communication device is more appropriate than communication by the second communication device.

The case in which communication by the first communication device is me re appropriate than communication. by the second communication device is, for example, the case in which the first communication device is capable of bidirectional communication with the energy supply device and the second communication device is capable of only one-way communication to the energy supply device. Specifically, we can consider the case where the first communication device is an RF communication device and the second communication device is an infrared communication device.

In the vehicle controllers of the present disclosure, the vehicle controller is programmed to make a second communication attempt from the first communication device to the energy supply device after a predetermined time has elapsed since the start of supplying energy to the energy supply device involving communication between the second communication device and the energy supply device; and switch from supplying energy to the energy storage device with communication between the second communication device and the energy supply device to supplying energy to the energy storage device with communication between the first communication device and the energy supply device when the energy supply device responds to the second communication attempt. When the energy supply device does not respond to the communication attempt for some reason, the energy supply to the energy supply device with communication between the second communication device and the energy supply device is started. Even in this case, when the energy supply device recovers from the situation within a predetermined time, it is possible to switch to supplying energy to the energy supply device with communication between the first communication device and the energy supply device in a more appropriate manner.

DETAILED DESCRIPTION OF EMBODIMENTS

Figure 1:
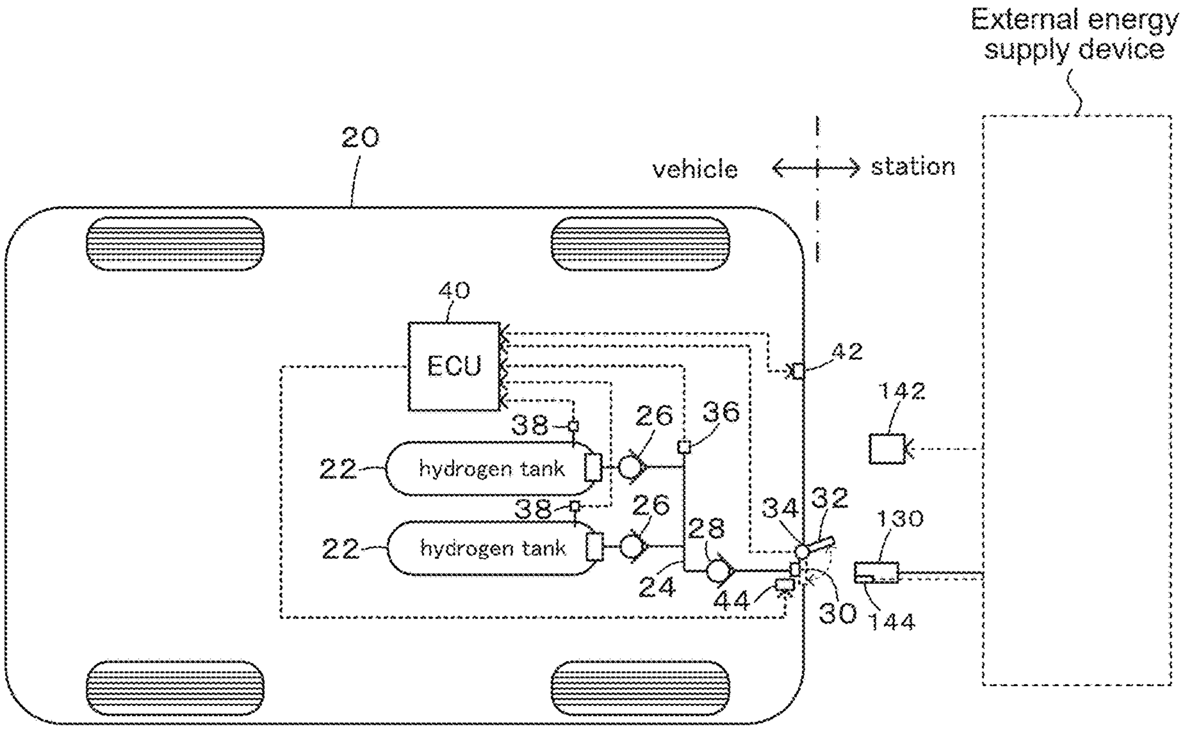
FIG. 1 shows a schematic configuration of a vehicle equipped with an electronic control unit 40, which is the vehicle controller of the embodiment of this disclosure.

Next, the embodiment of this disclosure will be described. FIG. 1 shows a schematic configuration of a vehicle 20 equipped with an electronic control unit 40, which is the vehicle controller of the embodiment of this disclosure. The vehicle 20 of the embodiment is equipped with the plurality of hydrogen tanks 22, the hydrogen filling connector 30, the radio frequency (RF) transmitter/receiver 42, and the infrared transmitter 44, in addition to the electronic control unit 40.

The hydrogen tank 22 is configured as a high-pressure hydrogen tank made of resin, for example. The plurality of hydrogen tanks 22 are connected to the hydrogen filling tube 24 via the check valve 28. The hydrogen filling tube 24 is connected to the hydrogen filling connector 30 via the check valve 28. Hydrogen from the plurality of hydrogen tanks 22 is supplied to the hydrogen consuming machine (e.g., fuel cell, hydrogen engine, etc.), which is not shown in the figure.

The hydrogen filling connector 30 is covered from the outside by the lid 32 as the opening and closing door. Hydrogen is filled into the plurality of hydrogen tanks 22 by supplying high-pressure hydrogen from the hydrogen filling station side, with the lid 32 open and the filling nozzle 130 of the hydrogen filling device at the hydrogen filling station connected to the hydrogen filling connector 30.

The RF transmitter/receiver 42 is configured as a radio transmitter/receiver capable of transmitting and receiving communications using a predetermined frequency band from about 300 Hz to 3 THz as a carrier wave. The RF transmitter/receiver 42 is located on the lid 32 side of the vehicle 20 so that it can communicate with the RF transmitter/receiver 142 located at the hydrogen filling station. The infrared transmitter 44 is configured as a general infrared transmitter that transmits data using infrared light The infrared transmitter 44 is located near the hydrogen filling connector 30 inside the lid 32. The infrared transmitter 44 transmits data to the infrared receiver 144 attached to the filling nozzle 130 when the filling nozzle 130 on the side of the hydrogen filling station is connected to the hydrogen filling connector 30. The hydrogen filling station is equipped with the station electronic control unit (not shown), which is configured as a microcomputer. The station electronic control unit inputs data received by the RF transmitter/receiver 142 and data received by the infrared receiver 144. Also, the station electronic control unit outputs the data to be transmitted from the RF transmitter/receiver 142.

The electronic control unit 40, not shown, is configured as a microcomputer with a CPU, ROM, RAM, flash memory, input/output ports, and communication ports The electronic control unit 40 inputs the lid open/close signal Lid from the lid sensor 34 which detects the open/close status of the lid 32, the hydrogen pressure Ph from the pressure sensor 36 attached to the hydrogen filling tube 24, and the in-tank temperature Th from the temperature sensor 38 which is attached to each of the plurality of hydrogen tanks 22 and detects the temperature inside the hydrogen tanks, via the input port. Also, the electronic control unit 40 inputs data received by the RF transmitter/receiver 42 attached to the plurality of hydrogen tanks 22 via the input port. The electronic control unit 40 outputs data transmitted from the RF transmitter/receiver 42 and data transmitted from the infrared transmitter 44 via the output port.

Figure 2:
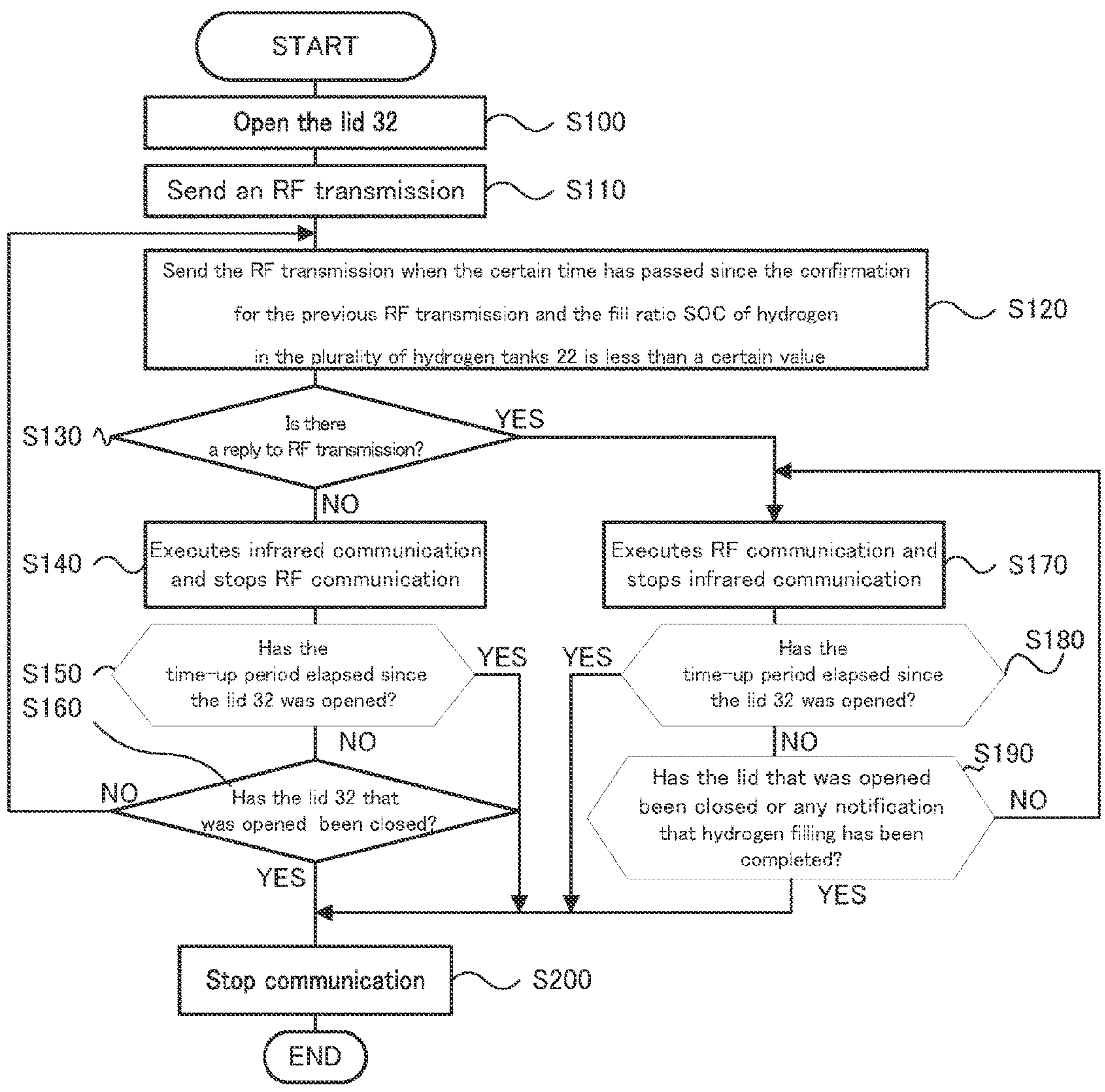
FIG. 2 shows a flowchart of an example of the filling-time communication process executed by the electronic control unit 40 of the embodiment

Next, the processing of the electronic control unit installed in the vehicle 20 thus configured will be described, particularly the communication processing on the vehicle 20 side when filling the plurality of hydrogen tanks 22 with hydrogen at the hydrogen filling station. FIG. 2 shows a flowchart of as example of the filling-time communication process executed by the electronic control unit 40 of the embodiment. The filling-time communication process is executed when the opening of the lid 32 is detected by the lid sensor 34.

When the communication process during filling is executed, the electronic control unit 40 confirms that the lid 32 has been opened (step S100), and then the RF transmitter/receiver 42 sends an RF transmission to the RF transmitter/receiver 142 at the hydrogen filling station to start communication (step S110).

Next, the electronic control unit 40 performs the RF transmission (step S120) when the certain time has passed since the confirmation for the previous RF transmission and the fill ratio SOC (ratio of remaining capacity to fully filled capacity) of hydrogen in the plurality of hydrogen tanks 22 is less than a certain value. Here, for example, 1, 2, 3, 5, or 10 seconds can be used as the certain Lime. The electronic control unit 40 then determines whether or not there is a reply from the hydrogen filling station side to the RF transmission (step S130).

When the electronic control unit 40 determines that there is a reply from the hydrogen filling station side to the RF transmission in step S130, it executes RF communication and stops infrared communication if it is being executed. (step S170). As RF communication, the vehicle 20 side repeatedly transmits the hydrogen pressure Ph from the pressure sensor 36 attached to the hydrogen filling tube 24 and the temperature Th in the tanks of the plurality of hydrogen tanks 22 detected by the temperature sensor 38, based on the request of the hydrogen filling station side, the hydrogen filling station side repeatedly transmits signals for the start and end of hydrogen filling, and the temperature and pressure of the hydrogen to be filled. The station electronic control unit on the hydrogen filling station side determine the fullness of the plurality of hydrogen tanks 22 using the hydrogen pressure Ph and the in-tank temperature Th received via RF communication, and determine the end of hydrogen filling.

Next, the electronic control unit 40 determines whether or not the time-up period has elapsed since the lid 32 was opened (step S180). The time-up time can be used, for example, a time sufficient to fully fill the plurality of hydrogen tanks 22 with hydrogen. When the electronic control unit 40 determines that the time-up time has not elapsed since the lid 32 was opened, it determines whether or not the lid 32 that was opened has been closed or whether or not it has received notification from the hydrogen filling station side that hydrogen filling has been completed (step S190). When the electronic control unit 40 determines that the lid 32, which had been opened, is closed, or when it receives a notification from the hydrogen filling station side that hydrogen filling has been completed, it determines that hydrogen filling has been completed, stops RF communication (step S200), and terminates this process. On the other hand, when the electronic control unit 40 determines that the lid 32, which was opened, is not closed and that it has not received notification from the hydrogen filling station side that hydrogen filling has been completed, it returns to the implementation of RF communication in step S170. When the electronic control unit 40 determines that the time-up time has elapsed since the lid 32 was opened in step S180, it stops RF communication (step S200) and ends this process.

Therefore, once the electronic control unit 40 starts implementing RF communication, it continues to implement RF communication until it determines that the time-up time has elapsed since the lid 32 was opened, or it determines that the lid 32, which had been opened, has been closed, or it determines that it has received a notification from the hydrogen filling station side that the hydrogen filling has been completed. When the electronic control unit 40 determines either of these, it stops RF communication and terminates this process.

When the electronic control unit 40 determines that there was no reply from the hydrogen filling station side to the RF transmission in step S130, it executes infrared communication and stops RF communication if RF communication is being executed (step S140). As infrared communication, the infrared transmitter 44 on the vehicle 20 side repeatedly transmits the hydrogen pressure Ph from the pressure sensor 36 and the in-tank temperature Th from the temperature sensor 38 at predetermined time intervals (e.g., every 1 or 2 seconds), the infrared receiver 144 on the hydrogen filling station side receives the hydrogen pressure Ph and the in-tank temperature Th repeatedly transmitted from the infrared transmitter 44 on the vehicle 20 side. The electronic control unit for the station on the hydrogen filling station side determines the fullness of the plurality of hydrogen tanks 22 using the hydrogen pressure Ph and the in-tank temperature Th received via the infrared communication, and determines the end of hydrogen filling.

Next, the electronic control unit 40 determines whether or not the time-up period has elapsed since, the lid 32 was opened (step S150). When the electronic control unit 40 determines that the time-up time has not elapsed since the lid 32 was opened, it determines whether or not the lid 32 that was opened has been closed (step S160). When the electronic control unit 40 determines that the lid 32, which had been opened, is closed, it determines that hydrogen filling is finished, stops infrared communication (step S200), and ends this process. On the other hand, when the electronic control unit 40 determines that the lid 32 that was opened is not closed, it returns to the process of RF transmission when a certain time has passed since the confirmation for the previous RF transmission in step S120 and the filling ratio SOC of hydrogen in the plurality of hydrogen tanks 22 is below a certain value. When the electronic control unit 40 determines that the time-up time has elapsed since the lid 32 was opened in step S150, it stops infrared communication (step S200) and ends this process.

Therefore, when the electronic control unit 40 determines that there was no reply from the hydrogen filling station side to the RF transmission, the RF transmission is basically performed every certain period of time. When the electronic control unit 40 determines that there is no reply from the hydrogen filling station side to the RF transmission, it continues the infrared communication until it determines that the time-up time has elapsed since the lid 32 was opened or the lid 32 that was opened is closed. When the electronic control unit 40 determines either of these, it stops infrared communication and ends this process. When the electronic control unit 40 receives a reply from the hydrogen filling station side to the RF transmission while performing infrared communication, it switches from infrared communication to RF communication.

In the electronic control unit 40 installed in the vehicle 20 of the embodiment described above, when a reply is received to an RF transmission when filling hydrogen at a hydrogen filling station, RF communication is performed to fill the plurality of hydrogen tanks 22. When the electronic control unit 40 does not receive a reply to the RF transmission, it performs infrared communication to fill the plurality of hydrogen tanks 22 with hydrogen. As a result, hydrogen filling can be performed using RF communication, which is a bidirectional communication, with hydrogen filling stations that are equipped with both the RF transmitter/receiver 142 and the infrared receiver 144, hydrogen filling can be performed using infrared communication, which is a one-way communication, with hydrogen filling stations equipped with only the infrared receiver 144. This allows hydrogen filling to be performed with more appropriate communication to both hydrogen filling stations equipped with both the RF transmitter/receiver 142 and the infrared receiver 144, and hydrogen filling stations equipped with only the infrared receiver 144. Also, the electronic control unit 40 prioritizes hydrogen filling using RF communication, which is a bidirectional communication, over hydrogen filling using infrared communication, which is a unidirectional communication. RF communication, which is a bidirectional communication, can be considered more appropriate for communication than infrared communication, which is a one-way communication, and thus hydrogen filling can be performed using more appropriate communication.

When the electronic control unit 40 installed in the vehicle 20 in the embodiment starts to implement infrared communication, it performs RF transmission every certain period of time to check whether or not a reply the RF transmission has been received. The electronic control unit 40 then continues hydrogen filling using infrared communication when there is no reply to the RF transmission even though RF transmission is performed after a certain period of time has elapsed. On the other hand, when the electronic control unit 40 receives a reply to the RF transmission after every certain period of time, it implements RF communication and switches to hydrogen filling using RF communication. In this way, when the hydrogen filling station is unable to reply to the RF transmission for some reason, it can start filling the plurality of hydrogen tanks 22 using infrared communication, which is a one-way communication, then, when the station recovers from the situation, it can switch to filling the plurality of hydrogen tanks 22 using RF communication, which is a bidirectional communication. As a result, it can fill up with hydrogen using more appropriate communications.

In the vehicle 20 of the embodiment, when hydrogen is filled into the plurality of hydrogen tanks 22 at the hydrogen filling station, it is assumed that hydrogen is filled using RF communication, which is a bidirectional communication, and infrared communication, which is a unidirectional communication. However, it is also possible to fill the hydrogen using two different communication methods. In this case, priority should be given to hydrogen filling using the more appropriate communication method.

Although the vehicle 20 of the embodiment is equipped with the plurality of hydrogen tanks 22, it may be equipped with only a single hydrogen tank 22.

The vehicle 20 of the embodiment has the plurality of hydrogen tanks 22 that are filled with hydrogen as the energy storage device, and the plurality of hydrogen tanks 22 are filled with hydrogen at a hydrogen filling station. However, the vehicle may be equipped with a plurality of gas tanks that are filled with natural gas, and the plurality of gas tanks may be filled with natural gas at a natural gas filling station, it may be equipped with a plurality of gas tanks filled with hydrocarbon fuel gas, and the plurality of gas tanks may be filled with fuel gas at a fuel gas filling station. The vehicle may also be equipped with a power storage device as an energy storage device and store electrical energy in a storage battery at the feeding station.

The following is an explanation of the correspondence between the main elements of the embodiment and the main elements of the invention described in the section on means to solve the problem. In the embodiment, the plurality of hydrogen tanks 22 correspond to "an energy storage device," the RF transmitter/receiver 42 corresponds to "a first communication device," the infrared transmitter 44 corresponds to "a second communication device," and the electronic control unit 40 corresponds to "a vehicle controller."

The correspondence between the major elements of the embodiment and the major elements of the invention described in the means to solve a problem section is an example of how the embodiment can be used to specifically explain the embodiment of the invention described in the means to solve a problem section. This does not limit the elements of the invention described in the means to solve the problem section. In other words, interpretation of the invention described in the means to solve a problem section should be based on the description is that section, and the embodiment is only one specific example of the invention described in the means to solve a problem section.

The above is a description of the form for implementing this disclosure using the embodiment. However, the present disclosure is not limited in any way to these embodiments, and can of course be implemented in various forms within the scope that does not depart from the gist of the present disclosure.

INDUSTRIAL APPLICABILITY

This disclosure is applicable to the manufacturing industry for vehicle controllers and other applications.

The invention claimed is:

1. A vehicle controller for a vehicle comprising:

a first communication device configured to perform bidirectional Radio Frequency (RF) communication;

a second communication device configured to perform unidirectional communication; and a processor programmed to:

transmit a communication request to an external energy supply device using the first communication device;

determine, after a predetermined time period, whether a reply to the communication request is received from the external energy supply device;

in response to not receiving the reply to the communication request after the predetermined time period, establish the unidirectional communication using the second communication device and initiate energy supply to an energy storage device of the vehicle; and periodically transmit the communication attempt from the first communication device at predetermined time intervals and in response to a fill ratio of hydrogen in the energy storage device being below a threshold value, wherein in response to receiving the reply to the periodically transmitted communication attempt, stop the unidirectional communication and establish the RF communication between the first communication device and the external energy supply device.

2. The vehicle controller according to claim 1, wherein the processor is further programmed to:

detect an opening of a lid before transmitting the communication request to the external energy supply device; and stop the RF communication or the unidirectional communication after a predetermined time period since a detected opening of the lid.

3. The vehicle controller according to claim 1, wherein the first communication device is an RF communication device; and the second communication device is an infrared communication device.

4. The vehicle controller according claim 1, wherein the processor is further programmed to:

in response to receiving the reply to the communication request after the predetermined time period, establish the RF communication using the first communication device and initiate energy supply to the energy storage device.

* * * * *